United States Patent
Gackstatter et al.

(10) Patent No.: US 9,024,784 B2
(45) Date of Patent: May 5, 2015

(54) METHOD AND WARNING DEVICE FOR WARNING A DRIVER OF A VEHICLE AND VEHICLE

(75) Inventors: Christina Gackstatter, Ingolstadt (DE); Markus Popken, Gaimersheim (DE); Jessica Reinhold, Ingolstadt (DE)

(73) Assignees: Audi AG, Ingolstadt (DE); Audi Electronics Venture GmbH, Gaimersheim (DE)

(*) Notice: Subject to any disclaimer, the term of this patent is extended or adjusted under 35 U.S.C. 154(b) by 374 days.

(21) Appl. No.: 13/368,925

(22) Filed: Feb. 8, 2012

(65) Prior Publication Data

US 2013/0038472 A1  Feb. 14, 2013

(30) Foreign Application Priority Data

Feb. 9, 2011 (DE) .......................... 10 2011 010 653

(51) Int. Cl.
| | | |
|---|---|---|
| *B60Q 1/34* | (2006.01) | |
| *G08G 1/00* | (2006.01) | |
| *B60W 50/14* | (2012.01) | |
| *B60W 30/095* | (2012.01) | |

(52) U.S. Cl.
CPC ............ *B60W 50/14* (2013.01); *B60W 30/0953* (2013.01); *B60W 30/0956* (2013.01); *B60W 2050/146* (2013.01); *B60W 2520/10* (2013.01); *B60W 2520/105* (2013.01); *B60W 2520/125* (2013.01); *B60W 2550/142* (2013.01); *B60W 2550/146* (2013.01); *B60W 2550/148* (2013.01); *B60W 2550/402* (2013.01); *B60Y 2300/26* (2013.01)

(58) Field of Classification Search
CPC ................. B60W 2050/146; B60W 2550/402; B60W 30/0953; B60Y 2300/26
USPC .......... 340/988, 576, 901, 902; 701/480, 442, 701/446, 469, 93
See application file for complete search history.

(56) References Cited

U.S. PATENT DOCUMENTS

| | | | | |
|---|---|---|---|---|
| 4,048,613 A | * | 9/1977 | Ito et al. .......................... | 180/169 |
| 6,141,619 A | * | 10/2000 | Sekine ............................. | 701/93 |
| 6,324,446 B1 | | 11/2001 | Brown | |
| 7,411,519 B1 | * | 8/2008 | Kuntman et al. ............. | 340/968 |
| 7,509,214 B2 | * | 3/2009 | Nagel ............................ | 701/507 |
| 7,744,451 B2 | | 6/2010 | Tipping et al. | |

(Continued)

FOREIGN PATENT DOCUMENTS

| | | |
|---|---|---|
| DE | 10 2005 055 744 A1 | 5/2007 |
| DE | 10 2006 005 021 | 8/2007 |

(Continued)

*Primary Examiner* — Curtis King
*Assistant Examiner* — Chico A Foxx
(74) *Attorney, Agent, or Firm* — Henry M. Feiereisen LLC

(57) ABSTRACT

In a method for warning a driver of a vehicle, the position of the vehicle on the roadway is determined. For the determined position of the vehicle, data relating to a curved roadway course in the area ahead of the vehicle are obtained and data relating to a self-motion of the vehicle are obtained using a driving dynamics sensor. The curved roadway in the area ahead of the vehicle is divided into at least two zones of criticality as a function of the data relating to the curved roadway course and the data relating to the self-motion, wherein each zone of criticality is assigned an assessment which assesses the driving behavior of the vehicle within the respective zone of criticality, and the assessments are outputted to the vehicle driver.

11 Claims, 2 Drawing Sheets

(56) References Cited

U.S. PATENT DOCUMENTS

| | | | |
|---|---|---|---|
| 8,068,979 B2 * | 11/2011 | Breed | 701/442 |
| 8,085,166 B2 * | 12/2011 | Tamir et al. | 340/901 |
| 8,184,008 B2 * | 5/2012 | Uozumi et al. | 340/576 |
| 2005/0209774 A1 * | 9/2005 | Finlay | 701/208 |
| 2005/0251335 A1 * | 11/2005 | Ibrahim | 701/213 |
| 2006/0178824 A1 * | 8/2006 | Ibrahim | 701/211 |
| 2006/0247845 A1 * | 11/2006 | Cera et al. | 701/117 |
| 2006/0261980 A1 * | 11/2006 | Beier | 340/988 |
| 2009/0300067 A1 * | 12/2009 | Denaro | 707/104.1 |

FOREIGN PATENT DOCUMENTS

| | | |
|---|---|---|
| DE | 10 2006 028 277 A1 | 12/2007 |
| DE | 10 2008 039 472 A1 | 2/2008 |
| DE | 102010027768 A1 * | 10/2011 |
| JP | 09 257 507 A | 10/1997 |
| JP | 2010-117839 A | 5/2010 |

* cited by examiner

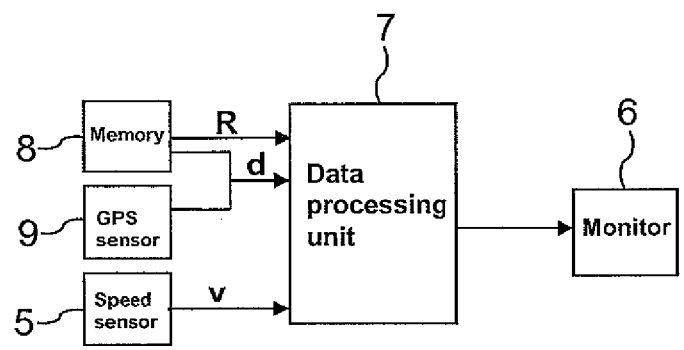
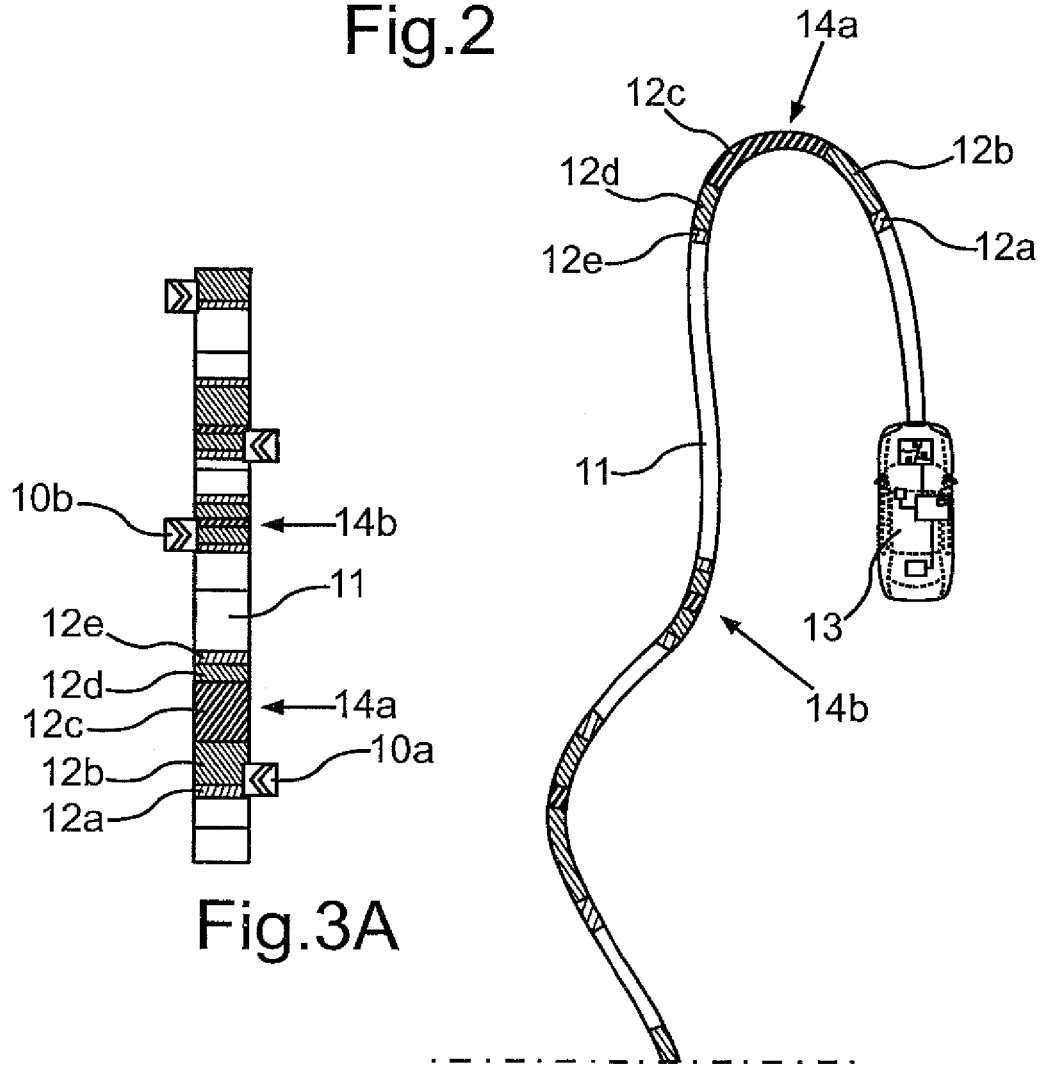

METHOD AND WARNING DEVICE FOR WARNING A DRIVER OF A VEHICLE AND VEHICLE

CROSS-REFERENCES TO RELATED APPLICATIONS

This application claims the priority of German Patent Application, Serial No. DE 10 2011 010 653.7, filed Feb. 8, 2011, pursuant to 35 U.S.C. 119(a)-(d), the disclosure of which is incorporated herein by reference.

BACKGROUND OF THE INVENTION

The present invention relates to a method and a warning device for warning a driver of a vehicle. The invention also relates to a vehicle having such a warning device.

The following discussion of related art is provided to assist the reader in understanding the advantages of the invention, and is not to be construed as an admission that this related art is prior art to this invention.

In motor vehicles, so-called curve assists are known to warn a driver of a vehicle of impending curves ahead in a roadway. The current speed of the vehicle can hereby be included in the warning system. Usually, warning occurs graphically on a display field in the interior of the motor vehicle by displaying the roadway course which is gained from navigation data.

It would therefore be desirable and advantageous to provide an improved method and device for warning a driver of a vehicle to obviate prior art shortcomings and to enable a driver to better assess a driving behavior of a motor vehicle in an impeding curve ahead and to avoid a dangerous situation.

SUMMARY OF THE INVENTION

According to one aspect of the present invention, a method for warning a driver of a vehicle includes determining a position of the vehicle on a roadway, obtaining data relating to the course of a curved roadway in an area ahead of the vehicle with regard to the determined position, obtaining data relating to a self-motion of the vehicle using a driving dynamics sensor, dividing the curved roadway in the area ahead of the vehicle into at least two zones of criticality as a function of the data relating to the course of the curved roadway and the data relating to the self-motion, assigning an assessment to each of the zones of criticality commensurate with a driving behavior of the vehicle in the zones of criticality, modifying the assessment in response to information received from another vehicle positioned in a region of the curved roadway relating to a characteristic of the curved roadway using car-to-car-communication of a car-to-car-communication system, and outputting the assessment of each zone of criticality to the driver of the vehicle.

Knowing the current position of the vehicle on the roadway allows in particular predicting the future roadway course, when the vehicle continues its drive and follows the course of the road. The data relating to the curved roadway course in the area ahead of the vehicle can be stored in a memory unit and assigned to the respective positions on the roadway. However, the data relating to the curved roadway course can also be obtained by sensors in the vehicle, which observe the area ahead of the vehicle. However, the data can also be provided to the vehicle by another vehicle or a traffic infrastructure object.

The driving dynamics sensor can in particular be present in the vehicle itself and be configured to measure speeds and/or accelerations of the vehicle.

The curved roadway in the area ahead of the vehicle can also be divided into three, four, five or more zones of criticality. Zone of criticality relates to a partial region of the roadway within the curved roadway course in the area ahead of the vehicle, for which region data were obtained. Each zone of criticality is assigned an assessment which describes a criticality.

The assessments can for instance relate to lateral accelerations of the vehicle within the region of the zone of criticality, when the vehicle moves at a certain speed within this zone. Different zones of criticality can have the same assessments. The curved roadway course can thus be divided into zones of criticality to result in a symmetric assessment distribution with regard to the sequence of the individual assessments. The assessments can in particular be outputted to the driver visually and/or acoustically, in the form of colors, symbols, pictograms, markings, and/or numeric values.

Dividing the curved roadway into at least two zones of criticality, and outputting this assessment to the vehicle driver, allows for a very easy and intuitive assessment by the vehicle driver as to how a vehicle will behave within the curved roadway course. The zones of criticality allow the driver to very easily assess whether a vehicle will behave critically, and within which partial region of the curved roadway course this behavior will begin. Based on these assessments, the driver can adjust his driving behavior to the expected situation early on, and reliably avoid critical driving situations. Overall, the driving safety is significantly improved. The division into several zones also allows a differentiated assessment and makes it easier for the driver to assess the situation.

According to another advantageous feature of the present invention, the data relating to the self-motion of the vehicle can include at least a current driving speed of the vehicle along the roadway, wherein the assessment about the driving behavior of the vehicle in each of the zones of criticality is assumed to include the current driving speed of the vehicle in the zones of criticality. Thus, it is assessed in particular how critical the driving behavior of the vehicle is within a defined region of the curved roadway course, if the vehicle maintains its current speed in this region. Depending on the course of the curvature of the roadway, significant lateral forces can act on the vehicle at certain speeds, which can lead to dangerous driving behavior. The speed, with which the vehicle enters a curve or drives through the curve, is of critical importance for the driving safety within the curve.

According to another advantageous feature of the present invention, the assessment is a measure of a probability, that the vehicle is unable to follow the course of the curved roadway in the respective zone of criticality. The assessment then indicates whether there is a high probability that the vehicle will swerve within the respective zone of criticality or shows oversteering behavior. In particular, the assessment can intuitively indicate to the vehicle driver, whether his vehicle will be able to stably follow the course of the curve when maintaining the current driving parameter, or instead is operating at a dynamic driving limit. Knowing the assessment then enables the driver to adjust his driving behavior early on—for example by reducing the speed—and thus to avoid a dangerous situation.

According to another advantageous feature of the present invention, the data relating to the curved roadway course are obtained from a digital map and include data relating to a roadway curvature radius and/or a roadway slope and/or a roadway condition. The digital map can in particular be stored in a memory of a navigation system and include appropriate data relating to the respective roadways or curves, which characterize the roadway in more detail. Depending on the roadway curvature radius, slope of the roadway or condition of the roadway, the driving behavior of a vehicle within the curved roadway course is different at a given speed. These characteristics therefore allow for a very accurate assessment of the driving behavior of the vehicle within the respective zone of criticality.

According to another advantageous feature of the present invention, the assessment is outputted visually to the driver by a colored marking of each of the zones of criticality, wherein the zones of criticality are designated on a stylized roadway course. The stylized roadway course can correspond to the customary roadway course known from the state of the art, as it is typically displayed on navigation maps of a vehicle navigation system. However, a different stylized display is also possible in which a multiple curved roadway is displayed as a straight course and the individual curves are indicated by symbols. In this case, the sequence of the zones of criticality is especially easy to recognize by the vehicle driver and the respective distances to the next curve are easier to estimate. The markings can in particular be represented by signal colors which intuitively symbolize the criticality. The vehicle driver is then only minimally distracted from observing the area ahead of the vehicle, because the assessment is communicated very intuitively and can be understood quickly. All essential information is easy to understand and the driving safety increases significantly.

According to another advantageous feature of the present invention, the data relating to the self-motion of the vehicle can include data relating to a longitudinal acceleration of the vehicle and/or a lateral acceleration of the vehicle. The longitudinal acceleration in particular allows predicting the future speed of the vehicle, and thus to estimate with which speed the vehicle enters the next curve. This can be of critical importance for the assessment of the criticality of the respective curve zones. If the vehicle is already located within a curve, the zones of criticality can be adjusted by taking the known current lateral acceleration into account. This allows for a very accurate assessment of the expected driving behavior of the vehicle.

According to another advantageous feature of the present invention, the dividing and/or outputting can occur in dependence on a current position of the vehicle on the roadway and/or data relating to a currently obtained self-motion of the vehicle. This allows a quick adjustment of the division into zones of criticality or the output of the assessments to the changing driving situation. The division can in particular be adaptive, i.e. be updated in rapidly succeeding intervals. As an alternative or in addition, the assessment can be outputted depending on the current position of the vehicle on the roadway and/or depending on the currently obtained data relating to the self-motion of the vehicle. For example, by changing the way the assessments are outputted, the vehicle driver can be alerted more strongly to the zones of criticality, the further the vehicle approaches the curved roadway course. This embodiment contributes to very up to date assessments, which are outputted to the driver in a very intuitively processed manner.

According to another advantageous feature of the present invention, the position of the vehicle on the roadway can be determined by using a satellite signal sensor. The satellite signal sensor can be in particular a GPS (Global Positioning System). These kinds of sensors allow a very accurate determination of the position of the vehicle on the roadway, and the assessments with regard to the criticality can be adjusted very accurately to the respective current driving situation.

According to another aspect of the present invention, a warning device serves for warning a driver of a vehicle and includes a position determining unit for determining a position of the vehicle on a roadway, a data acquisition unit operably coupled to the position determining unit and configured to obtain data relating to the course of a curved roadway in an area ahead of the vehicle with regard to the determined position, a driving dynamics sensor configured to obtain data relating to a self-motion of the vehicle, an assessment unit configured to divide the curved roadway in the area ahead of the vehicle into at least two zones of criticality as a function of the data relating to the course of the curved roadway and the data relating to the self-motion, wherein an assessment which assesses a driving behavior of the vehicle within each of the zones of criticality is assignable to each of the zones of criticality, a car-to-car-communication system configured to modify the assessment in response to information relating to a characteristic of the curved roadway and received from another vehicle positioned in a region of the curved roadway via a car-to-car-communication; and an output unit for outputting the assessment to the vehicle driver.

The position determining unit can in particular be a satellite signaling sensor. The driving dynamics sensor can be in particular a speed and/or acceleration sensor. The assessment unit can in particular be configured as data processing unit. The output unit can in particular be configured as visual output unit, for example as display.

According to another aspect of the present invention, a vehicle includes a warning device, which includes a position determining unit for determining a position of the vehicle on a roadway, a data acquisition unit operably coupled to the position determining unit and configured to obtain data relating to the course of a curved roadway in an area ahead of the vehicle with regard to the determined position, a driving dynamics sensor configured to obtain data relating to a self-motion of the vehicle, an assessment unit configured to divide the curved roadway in the area ahead of the vehicle into at least two zones of criticality as a function of the data relating to the course of the curved roadway and the data relating to the self-motion, wherein an assessment which assesses a driving behavior of the vehicle within each of the zones of criticality is assignable to each of the zones of criticality, a car-to-car-communication system configured to modify the assessment in response to information relating to a characteristic of the curved roadway and received from another vehicle positioned in a region of the curved roadway via a car-to-car-communication; and an output unit for outputting the assessment to the vehicle driver According to another advantageous feature of the present invention the vehicle can be a motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 a schematic representation of the processing of input parameters in a data processing unit, which is part of a warning device;

FIG. 3A a stylized roadway course which can be displayed on an output unit, with zones of criticality and assigned assessments in the form of colored markings according to a first exemplary embodiment; and FIG. 3B a stylized roadway course which can be displayed on an output unit, with zones of criticality and associated assessments in the form of colored markings according to a second exemplary embodiment.

DETAILED DESCRIPTION OF PREFERRED EMBODIMENTS

Figure 1:
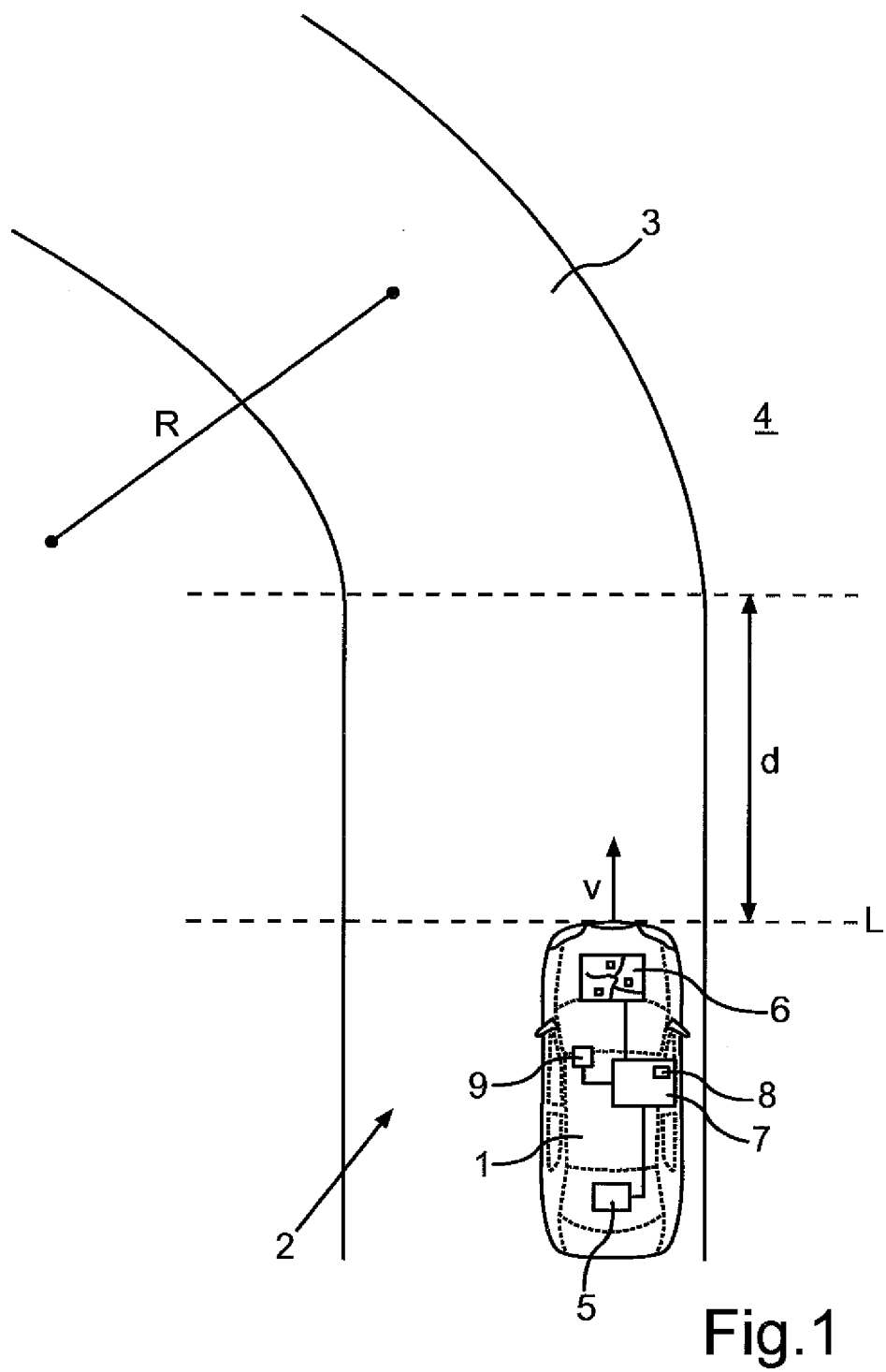
FIG. 1 a plan view of a motor vehicle on a road, approaching a curve.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 1 on a roadway 2, approaching a curve 3 with the speed v in the direction represented by an arrow. The curve 3 represents a curved roadway course of the roadway 2 and has a curve radius R. Thus, the curve 3 is located in the area ahead 4 of the car 1, which area in FIG. 1 extends above an imagined line L. Starting from this imagined line L, the motor vehicle 1 has a distance d to the curve 3.

The motor vehicle 1 includes a curve assist, which is intended to warn of curves that are approached to fast. The curve assist is formed by different devices in the motor vehicle 1: a speed sensor 5 senses the respective current speed v of the motor vehicle 1. A GPS-sensor 9 determines the current position of the motor vehicle 1 on the road. A data processing unit 7 processes the data provided by the GPS-sensor and the speed sensor 5 and is able to combine these data with data from a digital map, which is stored in a memory 8. The result of the analysis carried out by the data processing unit 7 can be displayed on a monitor 6 and outputted visually to the driver of the motor vehicle 1.

This relationship is shown again in FIG. 2. The distance d of the motor vehicle 1 to the curve 3 can be determined via a matching of the positional data of the motor vehicle 1 provided by the GPS-sensor with the data of the map stored in the memory 8. This distance d to the curve 3 is available to the data processing unit 7. In addition, the digital map stored in the memory 8 also includes information relating to the curve radius R of the curve 3. This information is also provided to the data processing unit 7. The speed sensor 5 transmits the speed v of the motor vehicle 1 to the data processing unit 7. Beside the speed sensor 5, other sensors can be provided, which provide the self-motion of the motor vehicle 1. For example, acceleration sensors can be provided, which provide data relating to longitudinal and lateral acceleration of the motor vehicle 1 to the data processing unit 7.

The criticality of the curve 3 is calculated in the data processing unit 7 by using the curve radius R, the distance d to the curve and the self-motion data (speed v, longitudinal and lateral acceleration). If the criticality exceeds a certain factor, the current speed of the motor vehicle 1 is too fast for the curve 3. The data processing unit 7 divides the curve 3 into different zones of criticality, wherein each zone of criticality is assigned a different degree of criticality.

These assessments or degrees of criticality, respectively, and the relative position of the zone of criticality relative to the current position of the vehicle 1 are then displayed to the driver on the monitor 6 by means of a graphic. Using the graphic, the driver can react to critical curves early on. A course preview is provided, which indicates how critical the curves lying ahead are for the motor vehicle 1 if driving through these curves with the current speed v. This course preview is adaptively adjusted to the respective speed v.

FIGS. 3A and 3B show two possible display concepts of this graphic on the monitor 6. In FIG. 3A, a vertical bar is shown, which corresponds to a stylized roadway course 11. The information "0 m" is located on the bottom edge of this bar, while the upper edge of the bar has the designation "500 m". This indicates the current distance of the motor vehicle 1 to respective points on the roadway 2 in the area ahead 4, when the actually curved roadway 2 is displayed one dimensionally. The curves to be expected on the roadway are known from the digital maps stored in the memory 8. These are shown in the form of curve symbols 10a and 10b. The curve symbol 10a shows that the curve 3 following next on the roadway 2 is a left hand curve. The curve following curve 3, on the other hand, is a right hand curve symbolized by 10b.

The curve designated 10a is divided into five zones of criticality. A colored marking is assigned to each of these zones of criticality. The zone of criticality 12a is colored yellow, while the following zone of criticality 12b is marked orange. Following is the zone of criticality 12c represented in red. In the following, the curve includes two further zones of criticality 12d and 12e, which are marked orange or yellow, respectively. These colored markings are not chosen at will but correspond to symbolic representations of the criticality of the respective zone. If the motor vehicle 1 moves within the zone of criticality 12a and 12e marked yellow, with the current speed v, the centripedal forces acting on the motor vehicle 1 are already at a limit for a stable driving behavior. If the motor vehicle 1 maintains its speed in the zones of criticality 12b and 12d, there is a risk of oversteering and individual wheels of the motor vehicle 1 can lose static friction with the roadway 2. This is symbolized with the orange coloration of this zone of criticality. The red coloration of the zone of criticality 12c symbolizes extreme danger to the driver and indicates, that the motor vehicle 1 will swerve at the latest in this region and a safe driving behavior is no longer guaranteed if the current speed is not reduced. The form of display is thus intuitively easy to understand for the driver and provides him with all necessary information to estimate the behavior of his motor vehicle 1 in the curves ahead. If the motor vehicle 1 changes its speed v, the zones of criticality are recalculated and reassessed in the data processing unit 7 and the display correspondingly adjusted.

The representation of FIG. 3B is somewhat less stylized or abstract than the one of FIG. 3A. The current position of the motor vehicle 1 is symbolized by a vehicle symbol, while the roadway course is represented two dimensionally. The curves 14a and 14b, which are located in the area ahead of the vehicle, are shown with their actual radii of curvature. The curve 14a is again divided into five zones of criticality 12a to 12e, wherein each of these zones is marked in color in analogy to FIG. 3A.

The representations of FIGS. 3A and 3B are constantly updated and adaptively adjusted to the speed v of the motor vehicle 1.

In the shown exemplary embodiment, the information relating to the radius of curvature R (or course of the radius of curvature, respectively) is obtained from the digital map stored in the memory 8. As an alternative, sensors can be provided in the motor vehicle 1, which sense the area ahead 4, and are able to gather information relating to the course of the curve 3. Such sensors can for example be a camera or a laser scanner. The motor vehicle 1 is equipped with a car-to-car-communication system. A second motor vehicle, which is already present in the curve 3, can then provide information relating to the characteristics of the curve 3 to the motor vehicle 1 via the car-to-car-communication. For example, if the curve 3 is slippery due to ice, this can be sensed by sensors in the vehicle driving ahead and communicated to the motor vehicle 1 via the car-to-car-connection. For example, information relating to the curve 3 is available to the motor vehicle 1 via the digital map stored in the memory 8. With the data from the car-to-car-communication, these data from the digital map can now be modified in the data processing unit 7 resulting in a reassessment or a new division, respectively, of the zones of criticality. The displays in FIGS. 3A and 3B are then almost instantly adjusted to the new information such that high quality information is available to the driver to adjust his driving behavior.

The division into zones of criticality and/or the assigning of the assessments to the zones of criticality can also take place by taking preferences of the driver into account. For example, the driver can adjust the data processing unit 7, such that it assesses according to a sporty driving behavior (higher thresholds of zones of criticality) or according to a comfortable driving behavior (lower threshold of zones of criticality). The division into zones of criticality and/or assignment of the assessments to the zones of criticality can take the roadway condition (fore example wide roadway, narrow roadway, slippery roadway) into account. For example, in the case of a slippery road, the thresholds of the zones of criticality can be lowered.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for warning a driver of a vehicle, comprising:
determining a position of the vehicle on a roadway;
obtaining data relating to the course of a curved roadway in an area ahead of the vehicle with regard to the determined position;
obtaining data relating to a self-motion of the vehicle using a driving dynamics sensor;
dividing the curved roadway in the area ahead of the vehicle into at least two zones of criticality for each curve as a function of the data relating to the course of the curved roadway and the data relating to the self-motion;
assigning an assessment to each of the zones of criticality commensurate with a driving behavior of the vehicle in the zones of criticality;
modifying the assessment in response to information received from another vehicle positioned in a region of the curved roadway relating to a characteristic of the curved roadway using car-to-car-communication of a car-to-car-communication system; and
outputting the assessment of each zone of criticality to the driver of the vehicle.

2. The method of claim 1, wherein the data relating to the self-motion of the vehicle includes at least a current driving speed of the vehicle along the roadway, and wherein the assessment about the driving behavior of the vehicle in each of the zones of criticality is assumed to include the current driving speed of the vehicle in the zones of criticality.

3. The method of claim 1, wherein the assessment is a measure of a probability, that the vehicle is unable to follow the course of the curved roadway in the zones of criticality.

4. The method of claim 1, wherein the data relating to the course of the curved roadway are obtained from a digital map and includes data relating to at least one member selected from the group of roadway curvature radius, roadway slope, and roadway condition.

5. The method of claim wherein the assessment is outputted visually to the driver by a colored marking of each of the zones of criticality, said zones of criticality being designated on a stylized roadway course.

6. The method of claim 1, wherein the data relating to the self-motion of the vehicle includes data relating to at least one member selected from the group consisting of longitudinal acceleration of the vehicle and lateral acceleration of the vehicle.

7. The method of claim 1, wherein at least one of the dividing and outputting steps is established in dependence on at least one member selected from the group consisting of a current position of the vehicle on the roadway, and data relating to a currently obtained self-motion of the vehicle.

8. The method of claim 1, wherein the position of the vehicle on the roadway is determined by using a satellite signal sensor.

9. A warning device for warning a driver of a vehicle, comprising:
a position determining unit for determining a position of the vehicle on a roadway;
a data acquisition unit operably coupled to the position determining unit and configured to obtain data relating to the course of a curved roadway in an area ahead of the vehicle with regard to the determined position;
a driving dynamics sensor configured to obtain data relating to a self-motion of the vehicle;
an assessment unit configured to divide the curved roadway in the area ahead of the vehicle into at least two zones of criticality for each curve as a function of the data relating to the course of the curved roadway and the data relating to the self-motion, wherein an assessment which assesses a driving behavior of the vehicle within each of the zones of criticality is assignable to each of the zones of criticality;
a car-to-car-communication system configured to modify the assessment in response to information relating to a characteristic of the curved roadway and received from another vehicle positioned in a region of the curved roadway via a car-to-car-communication; and
an output unit for outputting the assessment to the vehicle driver.

10. A vehicle, comprising a warning device for warning a driver of a vehicle,
said warning device comprising a position determining unit for determining a position of the vehicle on a roadway;
a data acquisition unit operably coupled to the position determining unit and configured to obtain data relating to the course of a curved roadway in an area ahead of the vehicle with regard to the determined position;
a driving dynamics sensor configured to obtain data relating to a self-motion of the vehicle;
an assessment unit configured to divide the curved roadway in the area ahead of the vehicle into at least two zones of criticality for each curve as a function of the data relating to the course of the curved roadway and the data relating to the self-motion, wherein an assessment which assesses a driving behavior of the vehicle within each of the zones of criticality is assignable to each of the zones of criticality;

a car-to-car-communication system configured to modify the assessment in response to information relating to a characteristic of the curved roadway and received from another vehicle positioned in a region of the curved roadway via a car-to-car-communication; and an output unit for outputting the assessment to the vehicle driver.

11. The vehicle of claim 10, wherein the vehicle is a motor vehicle.

* * * * *